March 18, 1952 — H. NUTT ET AL — 2,589,508
CLUTCH PLATE
Filed March 24, 1947 — 2 SHEETS—SHEET 1
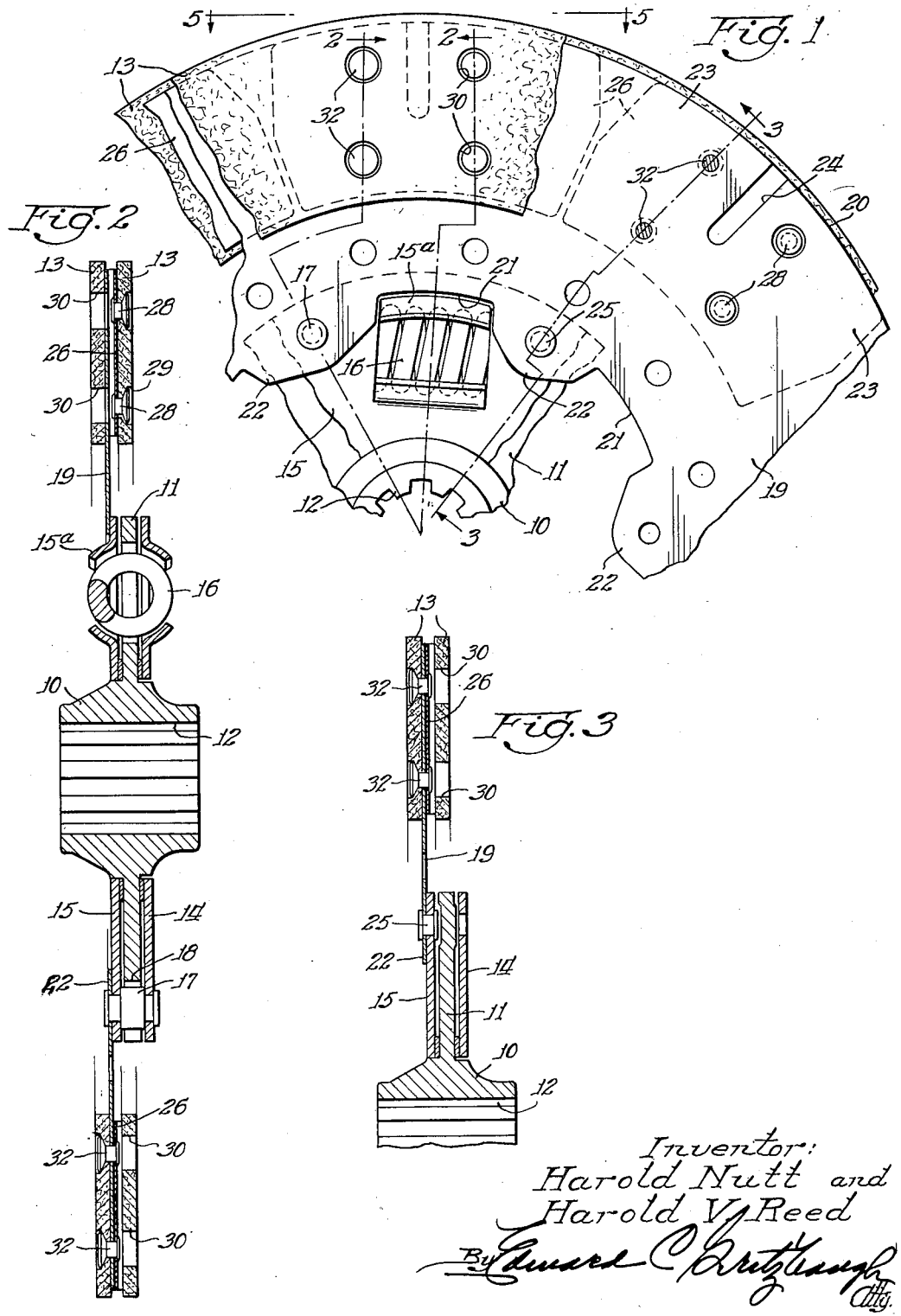
Inventor:
Harold Nutt and
Harold V. Reed

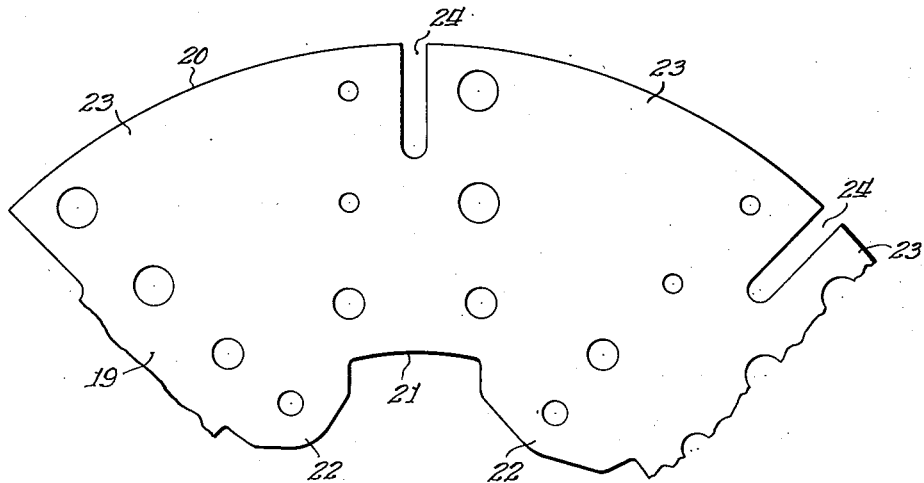
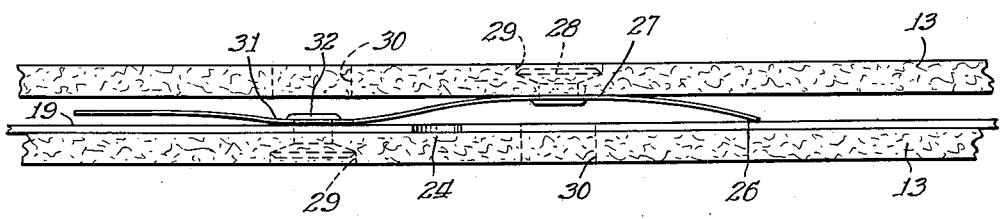

Patented Mar. 18, 1952

2,589,508

UNITED STATES PATENT OFFICE 2,589,508

CLUTCH PLATE

Harold Nutt and Harold V. Reed, Chicago, Ill., assignors to Borg-Warner Corporation, Chicago, Ill., a corporation of Illinois Application March 24, 1947, Serial No. 736,646

1 Claim. (Cl. 192—107)

This invention relates to improvements in friction clutch plates which are adapted to be packed between driving members of a clutch assembly for connecting a driving shaft to a driven shaft. The improvements are particularly directed to a novel structure for the purpose of cushioning the annular friction facing members and also for mounting such facings in spaced relation to each other and in turn connecting said cushions and facing members to the rigid inner region of a clutch plate.

A primary object of the present invention is to improve the construction and operation of friction clutch plates such as contemplated herein, whereby to increase the efficiency and dependability of such clutch plates.

Another principal object resides in providing a friction clutch plate wherein the facing material is arranged on opposite sides of inherently yieldable mounting members, the latter comprising a plurality of thin spring cushions which are structurally separate from each other and each of which is secured independently to a thin annular plate which is also positioned between the facings and extends inward therefrom and is secured to a rigid disc-like member which is embraced in the inner region of the clutch plate assembly.

An important feature of the present improvements is the fact that the facing mounting structure embodies an assembly having an outer zone which is adapted to cushion the friction facing members for relative axial yieldability, and having an inner zone which is generally non-yielding and is secured to or carried by a rigid intermediate plate on the central hub of the clutch plate.

Additional objects, aims and advantages of the improvements contemplated herein will be apparent to persons skilled in the art after the construction and operation of this clutch plate is understood from the within description. We prefer to accomplish the numerous objects of our invention and to practice the same in substantially the manner hereinafter fully described and as more particularly pointed out in the appended claim. Reference is now made to the accompanying drawings which form a part of this specification.

In the drawings:

Fig. 1 is a fragmentary elevation, viewed at the left or flywheel side of the assembly illustrated in Fig. 2 and showing a clutch plate assembly which is embraced in the present improvements, portions being broken away for clearness.

Fig. 2 is a transverse section taken along the plane of line 2—2 on Fig. 1.

Fig. 3 is a transverse section taken along the plane of line 3—3 on Fig. 1.

Fig. 4 is a fragmentary elevation of the annulus or disc-like portion of the yieldable facing mounting structure.

Fig. 5 is a view of a portion of the edge of the improved clutch plate, looking at the same on the plane of line 5—5 on Fig. 1.

The drawings are to be understood as being more or less of a schematic character for the purpose of disclosing a typical or preferred form of the improvements contemplated herein, and in these drawings these same reference characters identify like parts in the different views.

In the assembly herein shown the driven clutch plate assembly comprises hub 10 having a radially extending flange 11 and has a splined central bore which adapts the assembly for sliding axial movement on the correspondingly splined portion of a rotatable driven shaft which is not shown.

The friction facing members, preferably two axially spaced flat rings 13, are indirectly carried by the hub 10 in outwardly spaced relation to the hub assembly unit so that said facing members 13 occupy at least a portion of the annular outer region of the clutch plate assembly.

Ring-like washers or retainer discs 14 and 15, of cyanide hardened, low carbon, sheet steel, are carried by hub 10 at opposite sides of hub flange 11. These retainer washers 14 and 15, and the hub flange 11, each have a plurality of annularly arranged registered apertures for the purpose of receiving and retaining therein a plurality of helical springs 16. This arrangement preferably constitutes a hub assembly or unit which defines the inner zone or central region of the clutch plate. The parts of this assembled inner unit are maintained in desired relationship by spool-like retainer pins 17 having their ends upset on the washers 14 and 15 and having their barrel-like shanks positioned in recesses 18 in the hub flange 11. This permits relative rotative movement of the washers with respect to the hub and flange, and effects a well-known torsional vibration dampener connection between the hub and the washers or discs.

The facing members 13 may comprise any suitable friction material adapted for use on a friction clutch plate and are arranged so that they may be packed between rotatable clutch driving members to effect clutch engagement. Facing members 13 are maintained in the outer region of the clutch assembly and in yieldably spaced relationship to each other by means of the novel facing supporting and cushioning structure to which the present improvements are particularly directed.

The supporting and cushioning structure for facing rings 13 preferably comprises an integral plate or annulus 19 which is shown in the detailed face elevation in Fig. 4. This plate or annulus 19 is made of hard cold-rolled sheet steel .032" thick, as hereinafter stated. Said plate or annulus has a circular outer periphery 20 and a circular inner periphery 21, the latter being interrupted by a plurality of inwardly projecting lobes 22. The outer marginal portion of annulus 19 is divided into a plurality of sectors by radial slots 24 extending inward from the outer periphery 20.

The inner region of annulus 19 overlies the retainer washer 15 and extends outward therefrom to approximately the outer edges of facing members 13. As best seen in Figs. 2 and 3 the inner margin of annulus 19 is positioned flat against the outer margin of retainer washer or rigid disc 15 and the portions of the inner periphery 21 between the lobes 22 arches over the spring retaining shrouds 15a on retainer washer 15.

Alternate lobes 22 of annulus 19 have apertures for receiving the shanks of the retainer spool-pins 17, and the remaining lobes have apertures for receiving rivets 25 which pass through intermediate plate or retainer washer 15. In this manner the annulus 19 is securely anchored to the hub unit assembly or inner region of the clutch plate.

The facing mounting structure, in addition to the annulus 19, also includes a plurality of cushions 26, each having a generally segmental form and lying between the facings 13. These cushions are preferably stamped out of thin sheet steel and are arranged in approximately edge to edge annular array within the confines of the friction rings. As best seen in Fig. 1, the cushion members are structurally separate from each other and their segmental shape is effective in providing a substantially continuous circumferential cushion for the facings. Viewed at their edges (Fig. 5), it is apparent these cushion members 26 are of wavy or flattened ogee form. Each cushion member has a flat region or land 31 at the crest of a wave, defining a medial radius which is in flat surface contact against the annulus 19 to which it is secured by rivets 32. These rivets 32 also firmly attach one of the friction facings to the annulus 19. The heads of rivets 32 are seated in counterbores 29 in the facings and in order to accommodate the heads of said rivets the opposite facing ring has apertures 30 into which the heads will enter when the facings are packed during clutch engagement.

The crest of one of the cushion waves has a portion or land 27 which lies against the second or adjacent facing ring to which it is secured by rivets 28 with the heads set in counterbores in said adjacent facing in the same manner as described with respect to rivets 32. By reference to Fig. 1, it will be apparent that each cushion 26 overlaps or spans the slots 24 which divide the annulus 19 into the sectors. The right hand end of cushion spring 26, as shown in Fig. 5, contacts the annulus or plate 19. The opposite or left hand end of the cushion spring is a cantilever which does not touch the upper facing in Fig. 5 but clears it by a small amount so that when the cushion is compressed the main crown carries all the load for a short distance and the cantilever crown acts as a cantilever during a portion of its travel and then acts as a semi-elliptical spring during the remainder of its travel after the free left end has moved into contact with the mounting plate or annulus 19.

As before stated an important feature of the present improvements resides in the fabrication of the composite facing mounting and cushioning structure. The annulus 19 is made from thin hard, cold-rolled steel stock having a gauge within the range of .030" to .036" preferably approximately .032". This metal is particularly well adapted for the purposes of the present improvements because it may be held to close limits of parallelism and flatness. The separate cushions are fabricated from high-grade sheet metal stock such, by way of example, as scaleless black temper domestic spring steel, .65–.80 carbon, of a gauge within the range of .022" to .027" thick, preferably .025" thick. The supporting member in the assembly, to which the separate cushions are secured, is a medium carbon sheet metal stock such, by way of example, as hard, cold-rolled SAE–1025 approximately .030" to .036" preferably .032" thick, such metal having been found to be adequately strong for the purpose and can be accurately controlled for parallelism and flatness.

The plate 19 of the above-mentioned thin cold-rolled stock has an annular form and said plate is arranged with its inner margin overlapping and secured to a rigid washer-like intermediate member which is mounted on the hub, and the outer portion of this plate or disc extends radially outward between the facings approximately to the outer margins thereof. The structurally separate thin yieldable cushions are secured to said thin metal plate or disc 19 in the region thereof between the facings. Advantageously, this arrangement is such that the composite facing mounting and cushioning structure may be assembled as a unit, with or without the facings being attached, so that this unit is capable of ready assembly with a member of the hub assembly unit, such for example as the rigid retainer washer of the torsional vibration dampener. It is now apparent that a light weight composite mounting and cushioning structure has been provided for supporting the friction facings at the periphery of the inner region or hub assembly of a friction clutch plate. The spring cushions are riveted to the annulus in a manner so that they extend across the radical slots 24, which aid in effecting a truly flat plate during fabrication in a punch press.

While the improvements contemplated herein have been described in detail in the present preferred form or embodiment, it will be apparent to persons skilled in the art, after understanding these improvements, that various changes and modifications may be made therein without departing from the spirit or scope thereof. It is aimed in the appended claim to cover all such changes and modifications.

What is claimed is:

A clutch driven plate comprising a hub having a radial flange; a pair of axially spaced annular friction facings arranged radially outward from said flange; a rigid metal disc connected to said hub and extending outwardly alongside said flange, the outer periphery of said rigid disc being spaced radially inward from the inner peripheries of said annular friction facing members to provide a well-defined gap therebetween; and a generally flexible, composite lightweight assembly bridging said gap for flexibly connecting said facing members on said disc, said lightweight assembly comprising a thin, flexible, sheet metal annular plate structurally separate from and having less thickness than said disc, said thin annular plate extending across said gap and arranged with its inner peripheral region spaced a substantial distance outwardly from said hub and overlapping only the radially outer marginal region of said disc, and with its outer region extending radially outward beyond said disc to lie between said facing members in contact with a first facing member, said thin annular plate having its outer region radially slitted to define an annular row of spaced segments; means rigidly connecting the overlapping inner region of said flexible thin annular plate and the outer region of said disc; a plurality of structurally independent thin spring sheet steel cushions arranged in an annular row between the peripheries of said facing members, each cushion having arcuate contour and a wavy form and extending across a radial slit in said flexible thin annular plate for cooperation with two adjacent segments thereof; and pairs of radially spaced rivets attaching the respective facing members to the crests of circumferentially spaced waves of each cushion in radial planes at each side of said slits, certain of such pairs of rivets also attaching said flexible thin annular plate to the facing member which is contacted by said plate, said structurally separate flexible plate defining the sole supporting and interconnecting means between said disc and said cushions whereby the aforesaid flexible connection between said facing members and said disc is effected.

HAROLD NUTT.
HAROLD V. REED.

REFERENCES CITED

The following references are of record in the file of this patent:

UNITED STATES PATENTS

| Number | Name | Date |
| --- | --- | --- |
| 2,101,411 | Nutt et al. | Dec. 7, 1937 |
| 2,117,527 | Wemp | May 17, 1938 |
| 2,143,113 | Nutt et al. | Jan. 10, 1939 |
| 2,221,823 | Thelander | Nov. 15, 1940 |
| 2,286,502 | Newton | June 16, 1942 |